United States Patent
Chao (10) Patent No.: US 12,120,399 B2
(45) Date of Patent: Oct. 15, 2024

(54) METHOD AND SYSTEM FOR MATCHING CLIPS WITH VIDEOS VIA MEDIA ANALYSIS

(71) Applicant: Piksel, Inc., Atlanta, GA (US)

(72) Inventor: Gerald Chao, Los Angeles, CA (US)

(73) Assignee: NEP SUPERSHOOTERS L.P., Pittsburgh, PA (US)

(*) Notice: Subject to any disclaimer, the term of this patent is extended or adjusted under 35 U.S.C. 154(b) by 471 days.

(21) Appl. No.: 17/599,434

(22) PCT Filed: Mar. 27, 2020

(86) PCT No.: PCT/EP2020/058838
§ 371 (c)(1),
(2) Date: Sep. 28, 2021

(87) PCT Pub. No.: WO2020/193784
PCT Pub. Date: Oct. 1, 2020

(65) Prior Publication Data
US 2022/0189174 A1   Jun. 16, 2022

(51) Int. Cl.
*G06K 9/62* (2022.01)
*G06F 9/451* (2018.01)
(Continued)

(52) U.S. Cl.
CPC ......... *H04N 21/4884* (2013.01); *G06F 9/454* (2018.02); *G06F 18/2413* (2023.01);
(Continued)

(58) Field of Classification Search
None
See application file for complete search history.

(56) References Cited

U.S. PATENT DOCUMENTS 8,532,462 B2 * 9/2013 Ramamurthy ....... H04N 21/854
386/245
8,837,769 B2 * 9/2014 Yang ................... G06F 16/7847
382/224
(Continued)

OTHER PUBLICATIONS

International Search Report and Written Opinion issued by the European Patent Office for PCT Application PCT/EP2020/058838, mailed on Sep. 22, 2020.
(Continued)

*Primary Examiner* — Feng Niu
(74) *Attorney, Agent, or Firm* — Holzer Patel Drennan (57) ABSTRACT

A method includes comparing each textless video clip to a plurality of portions of the video file corresponding to the full length video file; determining each textless video clip being similar to only one portion of the video file as being a matched pair; for each matched pair identifying if their text content is different, wherein identification of a different text content dictates that the textless video clip corresponds to a portion of the video file having overlaid text; training a classifier to predict whether an area of text detected in the full length video is overlaid text; determining the probability of each portion of the full-length video having overlaid text; determining each textless video clip being similar to more than one portion of the video file as being a potential matched pair; and resolving the potential matched pairs with the determined probability.

20 Claims, 4 Drawing Sheets

(51) Int. Cl.
  *G06F 18/2413*   (2023.01)
  *G06V 10/74*     (2022.01)
  *G06V 10/82*     (2022.01)
  *G06V 20/40*     (2022.01)
  *G06V 20/62*     (2022.01)
  *H04N 19/42*     (2014.01)
  *H04N 19/44*     (2014.01)
  *H04N 21/488*    (2011.01)

(52) U.S. Cl.
  CPC ............ *G06V 10/761* (2022.01); *G06V 10/82* (2022.01); *G06V 20/46* (2022.01); *G06V 20/48* (2022.01); *G06V 20/49* (2022.01); *G06V 20/635* (2022.01); *H04N 19/42* (2014.11); *H04N 19/44* (2014.11)

(56) References Cited

U.S. PATENT DOCUMENTS

| | | | | |
|---|---|---|---|---|
| 9,380,312 | B2* | 6/2016 | Cote | H04N 19/196 |
| 9,552,520 | B1* | 1/2017 | Smolic | G06V 20/46 |
| 10,721,499 | B2* | 7/2020 | Chang | H04N 21/21805 |
| 11,863,818 | B2* | 1/2024 | Lile | H04N 21/45455 |
| 2003/0043172 | A1 | 3/2003 | Li et al. | |
| 2011/0116764 | A1 | 5/2011 | Ramamurthy et al. | |
| 2011/0129126 | A1* | 6/2011 | Begeja | G06F 16/784 |
| | | | | 382/118 |
| 2012/0027295 | A1* | 2/2012 | Shao | G06F 16/70 |
| | | | | 382/170 |
| 2012/0087583 | A1* | 4/2012 | Yang | G06F 16/7847 |
| | | | | 382/218 |
| 2016/0014421 | A1* | 1/2016 | Cote | H04N 19/14 |
| | | | | 382/170 |
| 2016/0286244 | A1* | 9/2016 | Chang | H04N 21/4788 |
| 2016/0328384 | A1 | 11/2016 | Divakaran et al. | |
| 2017/0011264 | A1* | 1/2017 | Smolic | G11B 27/105 |
| 2019/0050666 | A1 | 2/2019 | Kim et al. | |
| 2019/0311744 | A1* | 10/2019 | Shenkler | G11B 27/10 |
| 2022/0021931 | A1* | 1/2022 | Lile | H04N 21/44029 |

OTHER PUBLICATIONS

Bertini, M. et al., "Indexing for reuse of TV news shots", Pattern Recognition, Elsevier, vol. 35, No. 3, Mar. 1, 2002, pp. 581-591.
Gomes Alexandre et al., Automatic detection of TV commercial blocks: A new approach based on digital on-screen graphics classification, 2017 11th International Conference on Signal Processing and Communication Systems, IEEE, Dec. 13, 2017, pp. 1-6.
Lienhart, R., "Indexing and Retrieval of Digital Video Sequences Based on Automatic Text Recognition", Proceedings of the Annual Southeast Conference, Nov. 18, 1996, pp. 419-420.

* cited by examiner

METHOD AND SYSTEM FOR MATCHING CLIPS WITH VIDEOS VIA MEDIA ANALYSIS

BACKGROUND OF THE INVENTION

Field of the Invention

The present disclosure relates to the analysis of multimedia files, and more particularly but not exclusively to the matching of video clips to specific portions of full-length videos in order to generate new versions of videos.

Description of the Related Art

In today's complex media supply chains, a single episode of a show or a film may have multiple variations, often based on where the content is being consumed. For example, there can be one version for theatrical release, one for network broadcast, one for domestic syndication, one for DVD, one for online, and the list goes on.

Further complicating the issue, if an episode is to be distributed internationally, there can be multiple versions for different markets. To mitigate the complexity of international distribution, oftentimes one version of the video is produced that is sent to all international partners, which would then apply localization work onto the video prior to further distribution. In addition to translating the language tracks and closed caption texts, any text that has been overlaid on top of the video images needs to be also translated. This process is done by first removing any overlaid texts from the video, such that new texts localized to various audience locales can be overlaid in their place. This version of the video sent internationally without overlaid text is sometimes referred to as the "textless" version.

Currently, the process of creating these "textless" version of episodes consists of receiving two assets, provided by the content producers or the post production companies that prepared the videos. The first asset is the full-length episode with the overlaid text within the video, and the second asset is a sequence of video clips, each being a segment within the full-length video without the overlaid text. This is opposed to having two full-length videos per episode, one with and one without overlaid text. The reason for having only one "master" video is because edits are often made to the video, such as trimming, extending, or removing shots and scenes. If there are two full length videos, then every edit would have to be made to both versions and thus can become a source of errors if the edits are not kept in perfect sync. Therefore, the clips-based approach of supplying textless clips for just the portions of video containing overlaid texts is used.

While this method is better for maintaining one master video with all the edits, this approach also makes it more difficult to generate the textless version of the video. Traditionally, this process requires a manual process of inspecting the full-length video, finding portions that have any on-screen texts within the video, and then determining whether it is editorially overlaid or just background text occurring naturally within the scenes. For each instance of overlaid text, human operators then search for a replacement video clip within the other textless video file. If a replacement clip is found, it is then manually aligned and spliced into the full-length video as a way to "erase" the text on the screen.

Depending on the type of the video, there could be a handful of these instances with overlay texts to manually splice in textless replacements, but sometimes a video can have over 30 instances with text (for example) to replace, thus becoming a very time-consuming and labor-intensive process. There are also complications where the textless clips may be missing or of the incorrect length, thus further requiring more time and effort from the human operators to inspect, align, splice, and verify this manual process of producing textless versions of videos.

A need, therefore, exists for a method and system that is able to automate the process for analyzing, aligning, splicing, and verifying the generation of the textless versions of videos, given the original video plus the replacement clips of the texted portions.

SUMMARY OF THE INVENTION

The invention provides a method of processing a video file and a textless video file comprising a plurality of textless video clips, wherein the textless video clips are derived from the video file, the method comprising comparing each textless video clip to a plurality of portions of the video file, the plurality of portions corresponding to the full length of the video file; determining each textless video clip being similar to only one portion of the video file as being a matched pair; for each image matched pair identifying if their text content is different, wherein identification of a different text content dictates that the textless video clip corresponds to a portion of the video file having overlaid text; training a classifier to predict whether an area of text detected in the full length video is overlaid text in dependence on this identification; determining the probability of each portion of the full-length video having overlaid text via the trained classifier; determining each textless video clip being similar to more than one portion of the video file as being a potential matched pair; and resolving the potential matched pairs with the determined probability.

The textless video clips are preferably textless video frames.

Each textless video clip may have an image being similar to only an image of only one portion of the video file.

The method may further comprise the step of decompressing the video file and decompressing the plurality of textless video clips prior to the comparing step. The method may further comprise the step of decoding the video file and the plurality of textless videos into individual frames prior to the comparing step. The method may further comprise extracting individual textless clips, by identifying the start and end points of individual clips, such that the textless video is a collection of short video frames and the full-length video is one long collection of video frames. The method may further comprise grouping the video frames into shots and grouping the video clips into shots, each shot comprising a series of frames that are considered to contain the same amount of visual information. The method may further comprise converting each shot into a low dimension representation. Each shot may be converted into a low dimension representation by via selecting a representative frame and discarding unnecessary visual information. Converting each shot into a low dimension representation may comprise selecting one frame of the shot to represent all frames of the shot. The method may further comprise discarding information not needed for a matching process to provide a more compact representation. The method may further comprise taking the low-dimensional representation per shot from each textless clip, and searching for matches within the low-dimensional representation per shot from the full-length video. The searching may comprise allocating a distance metric to each comparison, with the lowest metric indicating the most likely match. Allocating the distance metric may comprises calculating the distance metric. The method may further comprise applying a threshold to assess the distance information. There may be determined a set of matched textless clips, corresponding to textless clips which are determined to match only one portion of the video file, and there is determined a set of unmatched textless clips which are determined not to match only one portion of the video file. The step of determining the textless video clips having an image being similar to only one portion of the video file may be unambiguous matching. The image of the video clips may be a per shot representation of the video clips.

The pair of matched textless video clip and similar only one portion may be represented in their original frames for the identifying step. The method may comprise performing text-in-image detection of the image frames per shot of both videos. The text-in-image detection may produce text boxes of detected texts and the video frames in which they appear. There may be provided a set of text boxes, and an identification of the video frames in which they appear. The method may further comprise comparing each text box per shot from the full-length video with the ones from the textless clips. Any difference may indicate that overlaid text is present in the full length video, and the absence of a difference indicates that the text is background text. The method may further comprise training a classifier based on this comparison, which receives as inputs pairs comprising overlaid text and background text, the classifier defining a model.

The method may further comprise performing text-in-image detection of the video file. The method may further comprise performing text-in-image detection of the shots of the video file. The method may further comprise scoring the probability that each shot of the full-length video includes overlaid text. The method may further comprise allocating a probability of overlaid text to each portion of the video having text in dependence on the classifier model. This may establish those portions of the video file with high probabilities of having overlaid text. The method may further comprise identifying those portions of the video file having text. The method may further comprise applying a probability to those identified portions.

The method may further comprise determining each textless video clip having an image being similar to more than one image of more than one portion of the video file, and selecting one portion of the video file for that textless video clip in dependence on the one having the highest probability of overlaid text. The method may further comprise taking the low-dimensional representation per shot from each textless clip, and searching for matches within the low-dimensional representation per shot from the full-length video. The method may further comprise increasing the likelihood of matching proportional to the probability of the shot including overlaid text. The method may further comprise taking the frame from each textless clip, and searching for per-frame matches within the frames from its unambiguously matched portion of the full-length video, to find the frame offset that results in the overall minimum distance.

The portions of the video which are unambiguously matched to a textless clip may be output as final matches.

The method may further comprise aligning the output unambiguous matches.

There is provided a method of identifying portions of a video which comprise overlaid text, comprising: in a first phase: receiving the video; receiving textless clips/video; comparing each textless clip to portions of the video; identifying those textless clips which match only one portion of the video; based on said identification, processing the textless clips and the matched portions of the video by: detecting the text images in each, and comparing the text images in each matched pair; identifying those matched pairs as each having a text box as background text; identifying these matched pairs in which only one has a text box as being overlaid text; training a model in dependence on said two identifications, in a probability step: receiving the video; detecting portions of the video having text; applying the model to said portions to compute a probability that the portion having text has overlaid text; thereby providing a probability of overlaid text for each portion having text, in a matching step: receiving the video; receiving the textless clips; identifying those textless clips of the video which match more than one portion of the video; selecting only one portion for that textless clip based on the portion having the highest probability; wherein all textless clips for which a match is found are uniquely matched to one portion of the video, in a second phase: receiving the video; receiving textless clips; comparing each textless clip to portions of the video.

The text images are preferably text-in-images. Comparing the text images preferably compares the detected text boxes in each text-in-image.

Comparing each textless clip to portions of the video may comprise comparing the video frames of each textless clip to the video frames of matched portions of the video.

There is provided a method of automatically identifying portions of a video which comprises overlaid text, comprising: receiving the video; receiving textless clips; comparing each textless clip to portions of the video; identifying those textless clips which match only one portion of the video; matching those textless clips which match only one portion of the video to that portion; identifying those textless clips which match more than one portion of the video; selecting one portion of the video for that textless clip based on the portion of the video determined to have the highest probability of containing overlaid text; match that textless clip to the selected portion of the video; wherein all textless clips are matched to one portion of the video.

There is provided a method of automatically identifying portions of a full-length video as being associated with overlaid text, comprising: receiving the full-length video; receiving textless clips of the full-length video; receiving a model for identifying portions of the full-length video as comprising overload text; identifying text in portions of the received full-length video, and in dependence on the model apportioning a probability value to such portion, the probability value indicating the probability of the text being overlaid text; identifying the textless clips which match any portion of the full-length video to provide matched pairs; if a textless clip matches only one portion of the full-length video, matching that textless clip to that portion of the full-length video; if a textless clip matches multiple portions of the full-length video, matching that textless clip to the one of the portions having the highest probability; and identifying each portion of the full-length video uniquely matched to a textless clip as containing overlaid text. The highest probability is preferably the highest probability of overlaid text.

There is provided a method of training a classifier, which classifier is used to process a full-length video to identify portions of the video which contain overlaid text, the method comprising: receiving the full-length video; receiving textless clips of the full-length video; identifying textless clips which match to only one portion of the full-length video to provide matched pairs; and detecting in each textless clip and portion of full-length video of each matched pair whether text is present; wherein if text is only present in the portion of the full-length video of a pair, that portion of the full-length video is identified as comprising overlaid text, and if text is present in the portion of the full-length video and the matched textless clip of a pair, that portion of the full-length video is identified as comprising background text; the method further comprising training a classifier for the full-length video in dependence on whether each matched pair is identified as being associated with overlaid text or background text.

There is provided a device for processing a video file and a textless video file comprising a plurality of textless video clips, wherein the textless video clips are derived from the video file, the device comprising: a comparison module for comparing each textless video clip to a plurality of portions of the video file, the plurality of portions corresponding to the full length of the video file; a comparison module for determining each textless video clip having an image being similar to only an image of only one portion of the video file as being a matched pair; a comparison module for identifying, for each image matched pair, if their text content is different, wherein identification of a different text content dictates that the textless video clip corresponds to a portion of the video file having overlaid text; and a training module for training a classifier to predict whether an area of text detected in the full length video is or contains overlaid text in dependence on this identification; a processing module configured to: determine the probability of each portion of the full-length video having overlaid text via the trained classifier; determine each textless video clip being similar to more than one portion of the video file as being a potential matched pair; and resolve the potential matched pairs with the determined probability.

There is provided a device for identifying portions of a video which comprise overlaid text, the device comprising: an input for receiving the video; an input for receiving textless clips/video; a comparison module configured to compare each textless clip to portions of the video and identify those textless clips which match only one portion of the video; a processor for processing, based on said identification, the textless clips and the matched portions of the video, the processor being configured to: detect the text images in each, and compare the text images in each matched pair; identify those matched pairs as each having a text box as background text; identify these matched pairs in which only one has a text box as being overlaid text; train a model in dependence on said two identifications, receive the video; detect portions of the video having text; apply the model to said portions to compute a probability that the portion having text has overlaid text; thereby providing a probability of overlaid text for each portion having text, in a matching step: the processor being further configured to: receive the video; receive the textless clips; identify those textless clips of the video which match more than one portion of the video; select only one portion for that textless clip based on the portion having the highest probability; wherein all textless clips for which a match is found are uniquely matched to one portion of the video, wherein the processor is further configured to: receive the video; receive textless clips; compare each textless clip to portions of the video.

The highest probability may be the highest probability of overlaid text. Comparing each textless clip to portions of the video may comprises comparing the video frames of each textless clip to the video frames of the matched portions of the video.

There is provided a device for automatically identifying portions of a video which comprises overlaid text, the device comprising: a first input for receiving the video; a second input for receiving textless clips; a comparison module for comparing each textless clip to portions of the video; a processor configured to identify those textless clips which match only one portion of the video; matching those textless clips which match only one portion of the video to that portion; identify those textless clips which match more than one portion of the video; selecting one portion of the video for that textless clip based on the portion of the video determined to have the highest probability of containing overlaid text; match that textless clip to the selected portion of the video; wherein all textless clips are matched to one portion of the video.

There is provided a device for automatically identifying portions of a full-length video as being associated with overlaid text, the device comprising: an input for receiving the full-length video; an input for receiving textless clips of the full-length video; an input for receiving a model for identifying portions of the full-length video as comprising overload text; a processor configured to: identify text in portions of the received full-length video, and in dependence on the model apportioning a probability value to such portion, the probability value indicating the probability of the text being overlaid text; identify the textless clips which match any portion of the full-length video to provide matched pairs; if a textless clip matches only one portion of the full-length video, match that textless clip to that portion of the full-length video; if a textless clip matches multiple portions of the full-length video, match that textless clip to the one of the portions having the highest probability; and identify each portion of the full-length video uniquely matched to a textless clip as containing overlaid text.

There is provided a device for training a classifier, which classifier is used to process a full-length video to identify portions of the video which contain overlaid text, the device comprising: an input for receiving the full-length video; an input for receiving textless clips of the full-length video; a processor configured to: identify textless clips which match to only one portion of the full-length video to provide matched pairs; and detect in each textless clip and portion of full-length video of each matched pair whether text is present; wherein if text is only present in the portion of the full-length video of a pair, that portion of the full-length video is identified as comprising overlaid text, and if text is present in the portion of the full-length video and the matched textless clip of a pair, that portion of the full-length video is identified as comprising background text; train a classifier for the full-length video in dependence on whether each matched pair is identified as being associated with overlaid text or background text.

In providing an automated technique for generating textless version from the original video and its replacement clips, the human operators may only need to inspect the final output of the textless version of videos, where the overlaid texts have already been replaced by their textless counterparts, to verify the successful removal of the overlaid texts.

In providing an automated technique the effort involved in producing the textless version of videos is greatly reduced, by largely automating the entire process and only requiring human operators to inspect the end results.

There are multiple challenges solved in order to provide an accurate, efficient, yet adaptive system for generating textless version of videos. The described technique is accurate to individual frames, such that it would not introduce visual discrepancy and audio-video synchronization issues during the replacement process. However, to be efficient such that the replacement analysis does not take too long and incur costs higher than human operators, the described technique avoids comparing videos at the frame-by-frame level except for the texted portions. Since overlaying text on top of videos is a creative process, there is no limitation to the size, location, style, background, etc., of these texts, and therefore the described technique needs to be adaptable to each video as to the variations in the appearance of overlaid text in order to differentiate them from naturally occurring texts within the video.

It is the combination of solving these challenges that enables the described technique to fully automate the textless replacement process.

There is described a method for analyzing input videos and automatically replacing portions with overlaid text in the full-length video with their counterparts of textless clips. The objective is to perform this automatic analysis in a manner that is comparable to manual processes, in terms of accuracy, robustness, and cost, such that the manual process can be substituted by the described technique without tradeoffs. In order to fulfil these requirements, the described technique introduces novel approaches in dealing with the variabilities in the overlaid texts within videos, as well as approaches to more efficiently analyze long videos to minimize processing costs.

From an efficiency standpoint, the input videos are analyzed and preferably converted into a low-dimension representation by removing as much of the duplicative information contained within the input videos as possible, without affecting the matching accuracy between them. With this reduced representation, the matching process is made much more efficient, thus minimizing the computation time and therefore the cost of the analysis.

From a robustness standpoint, the main challenge solved by the described method is to account for the large variations in the many different styles and locations for the overlaid text that can appear within the full-length video. The described technique can automatically learn to identify the overlaid texts by comparing the full-length videos with their textless counterparts. That is, by searching for the textless clips where any text is absent compared to the full-length video, these differences in texts are deemed as those overlaid by the content producers. These automatically identified text regions are then used to train a classifier using machine learning algorithms to automatically and adaptively differentiate between overlaid texts from background texts.

However, it may be necessary to break the circular dependency of the classifier depending on matched textless clips for its training, and the matching of textless clips depending on a trained classifier to identify overlaid texts in the video. One approach is supervised training, where a collection of manually matched textless videos is first used to train a classifier, which is then used to identify the overlaid texts needed by the alignment process. However, this approach has the drawback of the need for large manual effort in creating the training data, and more importantly, this approach would not be robust to novel texts being overlaid on new videos, since the classifier is trained to identify ones that occur within the training data.

Instead, the described technique trains a classifier per video being analysed, therefore being able to adapt to inter-video variations of placement and appearances of overlaid texts. The assumption is that while overlaid texts can vary between videos, there is sufficient intra-video uniformity of overlaid texts in terms of font, size, color, location, etc., such that this uniformity can be automatically learned by the classifier using machine learning algorithms. With a classifier specifically trained per video, it is able to more accurately distinguish the overlaid texts specific to that video.

A problem to address is how to train this classifier automatically, as the training data depends on the overlaid texts to be identified from video without human intervention. To break this circular dependency, the described technique preferably exploits the fact that there are varying levels of ambiguity of matching textless clips to the full-length video. That is, within the same video, some textless clips can be unambiguously matched with the full-length video, while other ambiguous clips can have multiple potential matches. Therefore, for the purpose of training the classifier, the unambiguously matched clips are used to collect examples of overlaid texts needed to train the classifier, which are then used to improve the matching accuracy of the ambiguous clips. In doing so, this novel approach breaks the circular dependency and enables a robust method for automatically identifying overlaid texts in videos and matching them with their textless replacements.

The described technique may be considered as being composed of four phases:

A first phase is to match textless clips to portions within the full-length videos of high confidence. This is accomplished more efficiently by preferably first decomposing both videos into a simpler representation by discarding any redundant information not needed by the matching process. Each textless clip is then preferably scanned across the full-length video for near matches, but not exact matches since the two videos are expected to be different due to one not containing the overlaid texts. For each textless clip, if there is only one match found of sufficient similarity, then it is considered a high confidence match between a video portion with overlaid text and its textless replacement.

A second phase is to train a predictive model to differentiate overlaid text from background text by training a classifier. This phase uses the matches from the first phase as training data, whereby the differences between the full-length video and the textless clips establish where the overlaid texts appear within the full-length video. Specifically, the frames between the two videos are compared for areas where they differ. Therefore, any texts that appear in the full-length video within these differing areas are automatically identified as overlaid text, whereas other texts that appear in rest of the frames are deemed as background text since they appear in both versions of the videos. In doing this comparative analysis, the described technique is able to automatically extract instances of overlaid texts versus background texts. These two classes of texts are then used to train a classifier for predicting whether an area of text detected in the full-length video is an overlaid or background text.

In a third phase, a probability is assigned to each portion/frame of the full-length video as to whether or not it contains overlaid text, using the trained classifier.

A fourth phase is to improve the matching accuracy via the trained classifier to identify portions of full-length video with high likelihood of overlaid text. This is advantageous for repetitive portions of videos that are visually similar to each other, such as a repeated shot of a landscape or skyline, but only one of them has overlaid texts. Without the classifier predicting which one contains the overlaid text, the matching of textless clip would avoid the one with overlaid text since it is actually visually more different. However, with the classifier identifying which segment has overlaid texts, this segment would be preferred over the non-texted ones, thus maximizing the matching accuracy.

At the end of this four phase process, the described technique is able to automatically search for the best match between each of the textless clip with portions within the full-length video with overlaid texts. The additional benefit of the trained classifier is that it is able to identify any portions within the full-length video with high likelihood of having overlaid text. In doing so, human editors can review these portions to verify whether each may be missing its textless counterpart, which can be an error on the provider of the textless video, or simply requiring additional translations of these texts as part of the work needed to deliver the video for further distribution.

In the description the terms portions and regions may be used interchangeably.

BRIEF DESCRIPTION OF THE FIGURES

The invention is now described by way of example with reference to the accompanying Figures, in which.

DESCRIPTION OF PREFERRED EMBODIMENTS

A system may be specifically engineered for analyzing videos for overlaid texts, and to search for matches within an alternate version of the video where the texts are removed. In providing such a system, these videos will no longer require a process of manual inspection, matching, alignment, stitching, and reviewing, that is time consuming and error prone.

Figure 1:
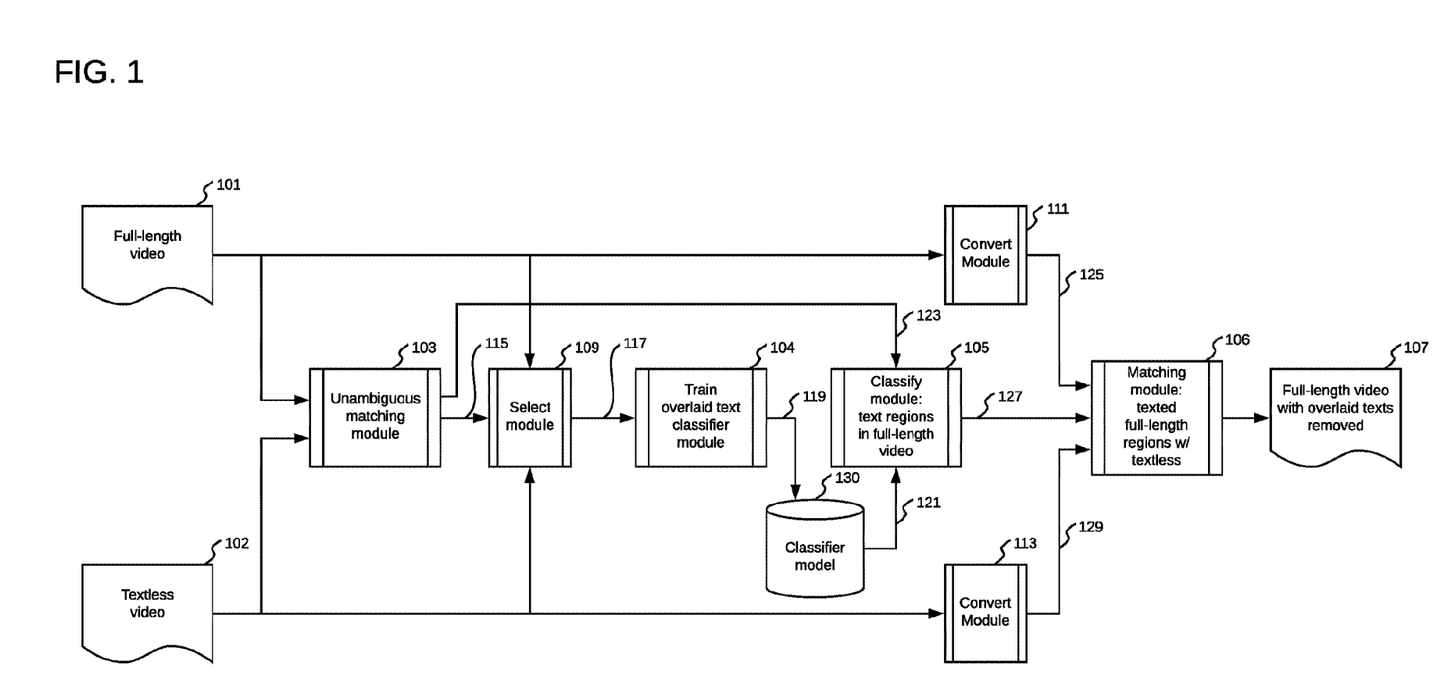
FIG. 1 illustrates an example of a system in which described examples may be implemented.

FIG. 1 illustrates in schematic form an exemplary architecture for processing information in accordance with described examples. As will be described in more detail below, some of the structures and functions illustrated in FIG. 1 represent optional functionality that need not be present in all implementations.

The process in the architecture of FIG. 1 comprises of a series of analysis phases implemented in modules which commence with the receipt of two video files.

Reference numeral 101 represents a file that is received that contains a full-length video with overlaid texts. This full-length video is a complete video, for example a complete episode of a programme.

Reference numeral 102 represents a textless video file that is received. The textless video file comprises a series of clips without texts overlaid onto the video.

The full-length video file 101 is, for example, a first media asset comprising a full episode of a programme or a film. The textless video 102 is, for example, a second media asset comprising a sequence of video clips. Each video clip is a portion of the full-length video without any overlaid text. Not every portion of the full-length video may be included in a video clip.

Techniques for generating the textless video from the full-length video are known. The textless video 102 is preferably generated from the full-length video 101 by the producers of the full-length video via a manual process using, e.g., video editing software.

In an alternative, the textless clips can be concatenated behind the full-length video, and a single input asset is provided. The single input effectively can then be split into two video inputs to provide the two inputs as above.

The first phase of the analysis is to compare the two videos, for example based on best-effort heuristics. This is performed in an unambiguous matching module 103. A matching step performed in the matching module 103 comprises searching individual textless clips from the textless video file 102 against the full-length video 101 for unambiguous matches.

The details of this comparison are described in FIG. 2 below, which describes the matching module 103 in more detail. In general, say that the full-length video is 20 minutes, and textless clips are 30 seconds long on average. The 30 second clips would ideally be compared on a per video-frame basis to the full-length video. However, this would be extremely computationally expensive. Therefore a 'shots' approach may be utilised as discussed below with reference to FIG. 2.

The matching step of the matching module 103 performs unambiguous matching. For example, if a textless clip contains a series of video frames of a Siberian tiger and there is only one instance in the full-length video with the same tiger images, the match would be considered unambiguous. However, if there is a textless clip comprised of a beach scene, and within the full-length video there are multiple scenes with similar looking beaches, this would be considered an ambiguous match. In module 103 the former would generate a match, and the latter would not generate a match.

For the purpose of this first phase performed in module 103, only the unambiguous matches between the full-length video portions and the textless clips are passed onto the next phase. That is, the objective of this first phase is to collect examples of unambiguously matched video portions, with and without the overlaid texts, thus allowing them to serve as training data for the next phase.

The output of the module 103 is a list of unambiguously matched pairs: textless clips and an unambiguous matched portion of full-length video, a portion being the starting and ending points of the video. There may be a need to capture timings here, e.g., what time offset from the start of the full-length video the portion represents.

The output of module 103 is the identification of unambiguous matches, a match being a textless clip and its corresponding portion within the full-length video, represented by the starting and ending times within the video.

It should be understood that each unambiguous matched pair output from block 103 is associated with text. The textless video clips in step 102 are generated to correspond with each portion of the full-length video which has text. It is possible for images to have multiple text boxes.

In the preferred example, the unambiguous matching module 103 generates an identification of a matched pair to a select module 109. The select module 109 also receives the full-length video 101 and the textless video 102, and selects pairs from these inputs based on the matching information. The actual pairs of video portions are then output from the select module 109.

In an alternative, the unambiguous matching module 103 may output the actual pairs directly.

A second phase of the described technique is to train a classifier. This second phase is performed in a train overlaid text classifier module 104.

The module 104 preferably receives the matched pairs from the output of the select module 109, or directly from the module 103. The matched pairs are unambiguous matchings of a textless clip and a portion of the full video.

The purpose of training the classifier is to be able to most accurately compute the probability of a text bounding box being an overlaid text, versus a naturally occurring text, or 'background text' within the video itself.

A text bounding box is simply a set of coordinates encompassing some text in an image, usually composed of a rectangle with four x-y coordinates within the image frame, or a polygon composed of multiple x-y coordinates.

Using the instances of text boxes from the first phase comprising overlaid text or background text as examples, a classifier can be trained using various machine learning algorithms to most accurately predict the probability of a text box being overlaid text or background text.

The operation of training module 104 will be explained in further details with reference to FIG. 3 below. In general, the unambiguous matching results from module 103 are used to train a classifier so that it can be used to assist in making decisions for ambiguous matching results. The output of module 104 is—as will be discussed further in FIG. 3 below—a trained classifier which can be used to calculate a probability of a text box being overlaid text or background text.

This train overlaid text classifier module 104 is preferably trained on a per-video basis, instead of the more traditional method of compiling a training set of overlaid text boxes from a video library. While the latter approach can also be taken, this per-video approach to training is advantageous for adapting to the variability of location and appearance of overlaid text that can vary from one show to another, and even one episode to the next. This approach improves the robustness of the described technique in accounting for frequently evolving appearances of overlaid texts within videos.

The output of module 104 is a trained classifier model, stored as denoted by reference numeral 130.

With a trained classifier for predicting overlaid texts, in a third phase there may then be computed the probability of each text box within the full-length video being overlaid versus being background text. This is performed in a classify module: text region in full-length video 105.

Module 105 receives the trained classifier model 130 from on line 121, and the full-length video. In the preferred example the module receives a version of the full-length video on line 123, which has been processed in module 103. The implementation of the classify module is set out in more detail in FIG. 4.

Using the previous example of the ambiguous beach scenes, the classifier is able to predict which pairs are most likely to contain overlaid text. This is particularly useful, if not essential, if this beach scene contains additional texts such as ones from store signage or road signs. If for example a matching process only uses the amount of detected texts within a scene for its matching metric, all of these candidates would be equally good matches, i.e. ambiguous. However, with a trained classifier, these texts may be classified as background text and thus penalized/discounted from becoming good matches.

The output of classify module 105 is a list of text bounding boxes from the full-length video, and a probability for each being overlaid or background text. This is further explained with reference to FIG. 4.

A fourth phase of the described technique is to receive as inputs the classified text boxes from the classify module 105, the full-length video 101 preferably via a convert module 111, and the textless video 102 preferably via a convert module 113.

The preferable convert modules 111 and 113 convert the respective full-length video and textless video into low resolution versions on respective lines 125 and 129 for further processing. This conversion is preferably done as otherwise the process is too computationally complex. Whether the conversion is needed, and what it requires, will be implementation dependent.

The output of the classify module 105 is provided on line 127.

These inputs are then used to perform a final matching process in matching module 106, by boosting portions within the full-length video with high probabilities of overlaid texts. In doing so, the ambiguous matches from the first phase become less ambiguous and thus more likely be accurately matched to the textless clips.

At the end of these four phases, each of the textless clips is matched with their most likely portions within the full-length video, fulfilling the primary objective of the described technique. This information can be used to splice and stitch the two videos into a new version as denoted by reference numeral 107 with all of the overlaid texts removed. This is a process well known to those in the art.

Additionally, since each of the text regions within the full-length video has been scored by the trained classifier, the portions with high probability of containing overlaid text can be also optionally outputted for additional review, such as for identifying ones missing textless replacement or needing translations to foreign languages.

The modules 103 and 104 may only be operational for an initial portion of a processing of a full-length video, until the classifier is trained and the classifier model is created. Thereafter only modules 105 and 106 may be required for processing the remainder of the full-length video. After being trained using modules 103 and 104, the classifier model is used to automatically process the full-length video using modules 105 and 106. Modules 105 and 106 are preferably operational during the training stage.

Figure 2:
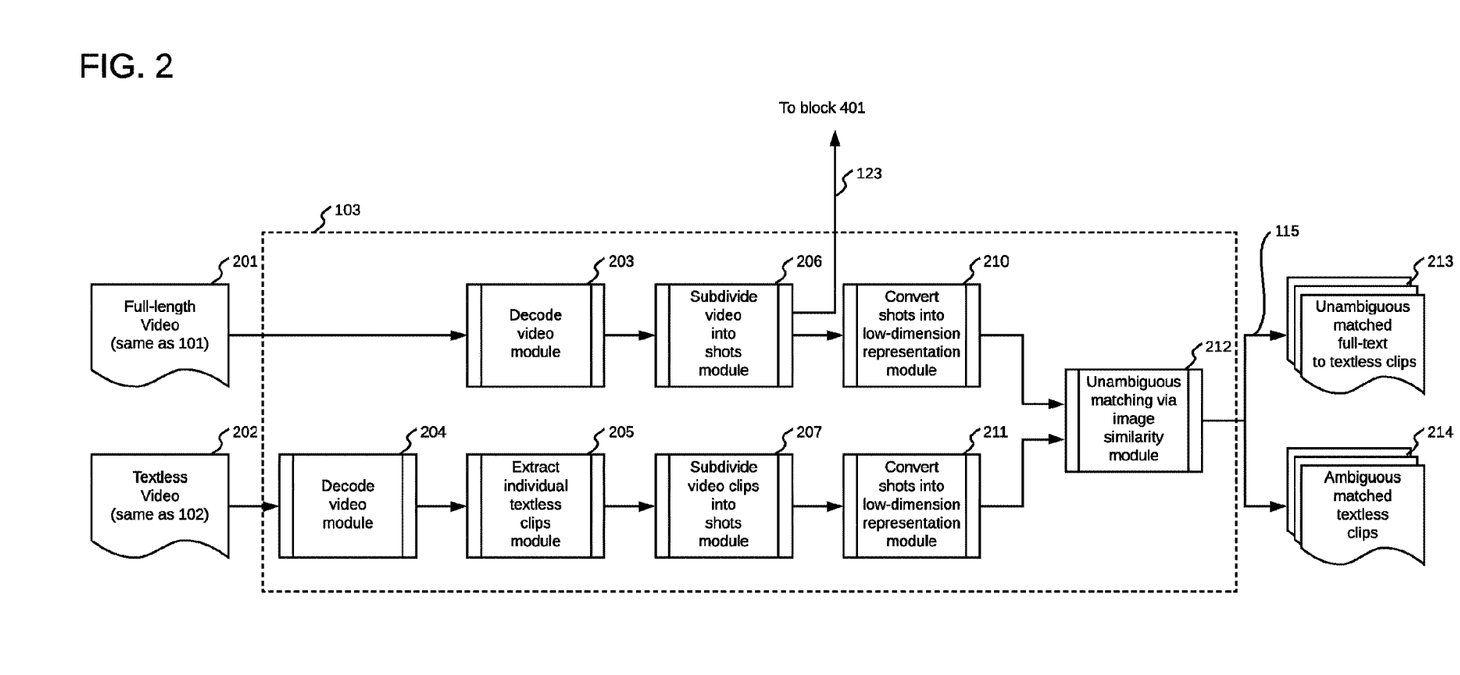
FIG. 2 illustrates an example implementation of a process for unambiguous matching between two videos.

With reference to FIG. 2, there is illustrated in more detail an example implementation of the unambiguous matching module 103 of FIG. 1, which as above represents the first phase of the process.

FIG. 2 illustrates in schematic form a detailed example of the manner in which a full-length video and a textless video are matched using a best-effort analyzer.

The full-length video 201 is received, and in parallel the textless video 202 is received. The videos 201 and 202 correspond to the videos 101 and 102.

The input full-length video 201 and the textless video 202 may be first decoded into individual frames in respective video decoder modules 203 and 204. These decoding modules may be implemented in existing software or hardware components, and the choice is up to the implementor of the system, as long as it is able to convert the input videos in their compressed format into individual video frames. Optionally, these decoded frames can be resized into smaller frames to save resources by subsequent steps, either by the decoders or as a separate step.

For the textless video frames, there may need to be an extra step for extracting individual clips by identifying the starting and ending points of each clip, as denoted by module 205. Since these clips are normally separated by black regions in the video, this step can be accomplished by identifying regions of blacks, and inverting the time spans into the start and end points of the individual clips. There are multiple methods for identifying black regions in video frames which are well known to those in the art.

Once the textless video is subdivided into individual clips, each is treated as a collection of short video frames, whereas the full-length video is one long collection of video frames.

Both sets of video frames may then be sent to respective video shot analysis modules 206 and 207. In modules 206 and 207 the video frames are grouped into "shots." A shot is the name for a series of video frames that are considered to contain the same amount of visual information, i.e., duplicative and near-duplicative frames.

The purpose of modules 206 and 207 are two-fold: one is to reduce the number of frames needed to be processed and matched in subsequent steps, and two, to create a temporal fingerprint of the visual changes in the videos. That is, the first (when used) is for efficiency reasons, and second is a preferable technique for matching similar regions between videos based on visual transitions.

There exist multiple methods for computing shots given a series of video frames, such as via image similarity, optical flow, and deep neural networks trained to identify transitions, and they are well known to those in the art. The choice of shot analyzer to use is up to the implementors, provided it is able to identify shot boundaries based on visual transitions. One benefit of the described technique is that these shot boundaries need not be perfectly accurate, since this step is more of a compression and fingerprinting technique. As long as both the full-length and textless videos are analyzed using the same shot analyzer, the rest of the matching process will function as described.

Thus the full-length video is grouped into shots in module 206, and separately the textless video is grouped into shots in module 207.

The version of the full-length video converted into shots is also preferably provided on line 123 for use in the classify module 105, as is described with reference to FIG. 4 below.

With the video and clips grouped into shots, each shot is then converted into a low-dimension representation in respective modules 210 and 211. That is, each shot is considered visually the same across its frames, and thus one frame from each shot is used to represent the entire shot, usually the middle frame of the shot's time span. These frames may be converted into a more compact representation (in a step not shown) by discarding information not needed for the matching process, while allowing for distance metrics to be computed based on visual similarity between them.

For example, one possibility of the conversion is to take an image, say 1080 width by 720 height in pixel with three channels of color, and convert it to a grayscale image of 64 by 64 in size. This would discard most of the redundant information such as color and visual details, while preserving enough details for comparing how similar this frame is to another.

There are multiple methods for this dimensionality reduction step, including the described resizing and color reduction method, or via some principal component analysis, image hashing algorithms, as well as deep neural network models such as auto encoders and generative models. The specific approach is up to the implementor of the system, provided that it is able to effectively reduce the input image frames into a more compact representation, while preserving the distance computation between images, whereby more similar images would have a small distance and distinct images would have a large distance.

Each of modules 203, 206, 210 provides optional functionality. Any one module may be implemented without the others. Similarly each of modules 204, 205, 207, 211 provides optional functionality, and any one may be implemented without the others.

The final module in the process of FIG. 2 is to take as inputs the low-dimensional representation per shot from each of the textless clips, and search for matches within the low-dimensional representation per shot from the full-length video in module 212.

Since one clip can contain multiple shots depending on its visual content, and the full-length video can also be composed of hundreds or even thousands of shots, this matching step is effectively searching a clip of n shots across the full-length video composed of m shots, n being much smaller than m typically. Thus, with a textless video with t clips, per clip n shots are scanned across m-n+1 shots for the best match via the distance metrics per pair of n shots.

Due to the large number of comparisons needed, the compression preferably done by the previous steps makes possible for an efficient matching process. If the raw image frames are used for this comparison, the computational cost may be too high to be economical. Further, the distance computation between the low-dimensional representations can be done efficiently using operations such as Euclidean or cosine distances and are well known to those in the art.

With the method or calculations for pair-wise distances between n shots generated or decided, the process for determining the best match begins with computing the distance metric for a clip of n shots across the m-n+1 possible locations across the full-length video shots. It is then followed by finding the location with the lowest distance value to determine the most likely match. However, one cannot assume this is the correct match, due to ambiguous cases that can result where the textless clip may be matched to the wrong portion in the full-length video.

To differentiate between ambiguous and unambiguous matches, heuristics can be used to reject ambiguous matches. One simple approach is a minimum threshold for the distance between the two video shot pairs, as they should be quite similar except for the difference due to overlaid texts. Another approach is to verify that the portion of full-length video does contain some minimum amount of text. Another is to check for the uniqueness of the shots of the matched portion within the full-length video. That is, as in the tiger example described earlier, if the portion contains one or more shots that are unique across the video, then the match is unambiguous. Conversely, if the shots are composed of ones that are repeated across the video, they can be rejected as ambiguous matches. It is worth noting that because of benefits of the distance metrics that the low-dimensional representations provide, the same representations are used for efficient checking for the uniqueness of the shots across the full-length video.

At the end of this phase of the analysis, there are two sets of textless clips, ones that have been unambiguously matched with the full-length video 213, and the other set that are considered unmatched 214.

Even if every textless clip is successfully matched, the analysis process continues to further analyze the entire full-length video for portions that may contain other overlaid texts.

The unambiguously matched full-text to textless clip pairs 213 correspond to the output of module 103 in FIG. 1. The pairs 213 comprise a set of pairs, each pair being a textless video clip, and the portion of the full-length video to which it corresponds.

As these are preferably generated after processing the video in modules 203 to 211, these clips are low-dimension slots. It may therefore be the case that an identification of the pairs (which may be provided by the shot/low-dimension versions), is output.

The remaining textless clips, not being unambiguously matched, are shown in step 214.

Figure 3:
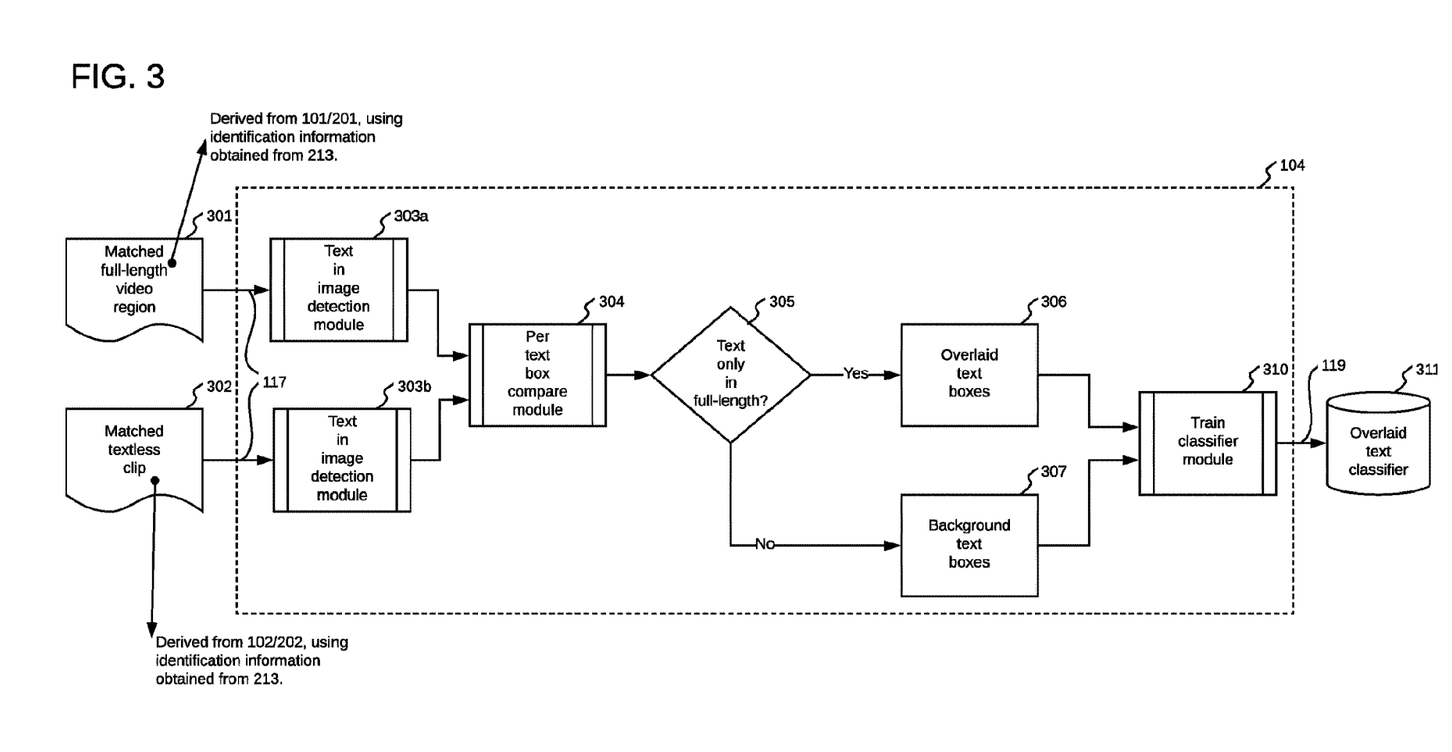
FIG. 3 illustrates an example of implementation of a process for training a classifier to differentiate two types of on-screen text.

With reference to FIG. 3, there is illustrated in more detail an example implementation of the train overlaid text classifier module 104 of FIG. 1, which as above represents the second phase of the process.

The objective for the second phase of the described technique is to automatically train a classifier to distinguish the overlaid texts from the background ones. This second phase begins with the pairs of textless clips 302 unambiguously matched with their full-length video portions 301, but now represented in their original image frames. That is, while during the matching process the low-dimensional representation is used, in this phase the full image content is used to identify the texts.

301 and 302 represent the inputs to step 104. 301 and 302 are the matched full-text to textless clip pairs from steps 213 of FIG. 2.

The video frames are individually processed for detecting texts within the images in modules 303*a* and 303*b*.

This may be achieved using a variety of possible methods. One approach is using traditional computer vision algorithms such as via edge detection or stroke width transform, which are efficient but not as reliable. More recent approaches using deep neural networks trained to detect text bounding boxes within images work much more effectively, at the expense of more computations. The specific approach for detecting text boxes within images is up to the implementor and is well known to those in the art. As long as the chosen approach is able to detect a majority of the overlaid texts, which are usually more prominent and well formatted, and some of the background text consistently, the rest of the analysis phases will function as expected.

The outputs of the text detection steps 303*a* and 303*b* are a set of text boxes and which video frames they appear in.

Note that the textless clips are still searched or analysed for text detection, as they contain background text.

The next step is to compare all of the text boxes per shot from the full-length video with the ones from the textless clips in a module 304. As the two videos should only differ by the overlaid text added to the full-length video, any text boxes that only appear within the full-length video are assumed to be editorially overlaid.

Module 304 compares the text boxes from modules 303*a* and 303*b* to generate an output labelling whether each text box is only in the full-length video or not.

That is, this module 304 is simply a decision process (per module 305), as to whether the text box only appears in the full-length video or not.

If it is determined that the text only appears in the full-length video, the pair is considered to comprise an overlaid text box and is stored in module 306.

If it is determined that the text appears in the full-length video and the textless clip, the pair is considered to comprise background text and is stored in module 307.

This comparison is of the matched pairs, and if they differ it is because there is an overlaid text in the video portion which has been removed from the textless clip. So in effect, module 304 is identifying which pairs have text, specifically overlaid text, and comparing them to see if the text is in both, i.e. if the text box is only in the full-length but missing from the textless version.

An alternative approach is to first compare the two images for areas of pixel differences, and only detect and accept text boxes that appear within those areas as overlaid texts. This alternative approach has the advantage of avoiding inconsistencies in the text detector from step 303, but with the added computational cost of comparing the images. Therefore, this step is an optional addition and depends on the reliability of the text detector the implementors choose.

Via this comparison process, this is how the overlaid texts are automatically extracted from the full-length video itself, without any prior information or knowledge outside of the input videos. By making no assumptions, the overlaid texts can vary in appearance from one video to the next, yet the described technique can automatically adapt to the variations in their appearance and placements.

The last step in this second phase is to train a classifier. This training is controlled by a train classifier module 310, which uses machine learning algorithms to predict a text box being either overlaid or background, i.e., a binary classifier. The input-output pairs to the classifier are the outputs from modules 306 and 307. The training module provides an output on line 119 to generate the overlaid text classifier 311.

The classifier module 310 thus receives the unambiguously matched pairs, and the information as to whether the text in each matched pair is overlaid text or background text. Based on this information, the classifier is trained to learn to identify overlaid text in a video.

The classifier is thus trained so it can distinguish overlaid text from background text. This is something regular/generic text detectors cannot distinguish. Once the classifier is trained based on, e.g. 10% of the video, it may be used to determine the text boxes from the remaining 90% of the video as being overlaid or not.

The representation of the text boxes is dependent on the classifier model chosen for this classifier and is up to the implementors.

For example, one can use a convolutional neural network for the classifier, thus its input would be the image cropped from each text boxes, such that it can extract visual features useful for predicting the output. Another possibility is simple feed-forward neural networks, which take the same input and output pairs but are simpler to train. Even simpler are decision trees or even Naive Bayes classifiers, whose inputs can be not the images but features such as position, height, width, aspect ratio, etc., of the text boxes, and predict the same outputs. These classifiers may not be as accurate as image based ones, but they are much simpler to train and faster to run predictions on. The choice of which classifier model to use is up to the implementors and are well known to those in the art, as long as it is able to accurately predict the likelihood of a text box being overlaid or not.

At the end of this second phase, a classifier is automatically trained to predict a text box as being overlaid or background, based on the examples extracted from the full-length video and that video only. This technique eliminates any assumptions about how the texts may be overlaid, and therefore is more robust towards the many variations texts can appear within videos.

The trained classifier model is stored in a store 311.

Figure 4:
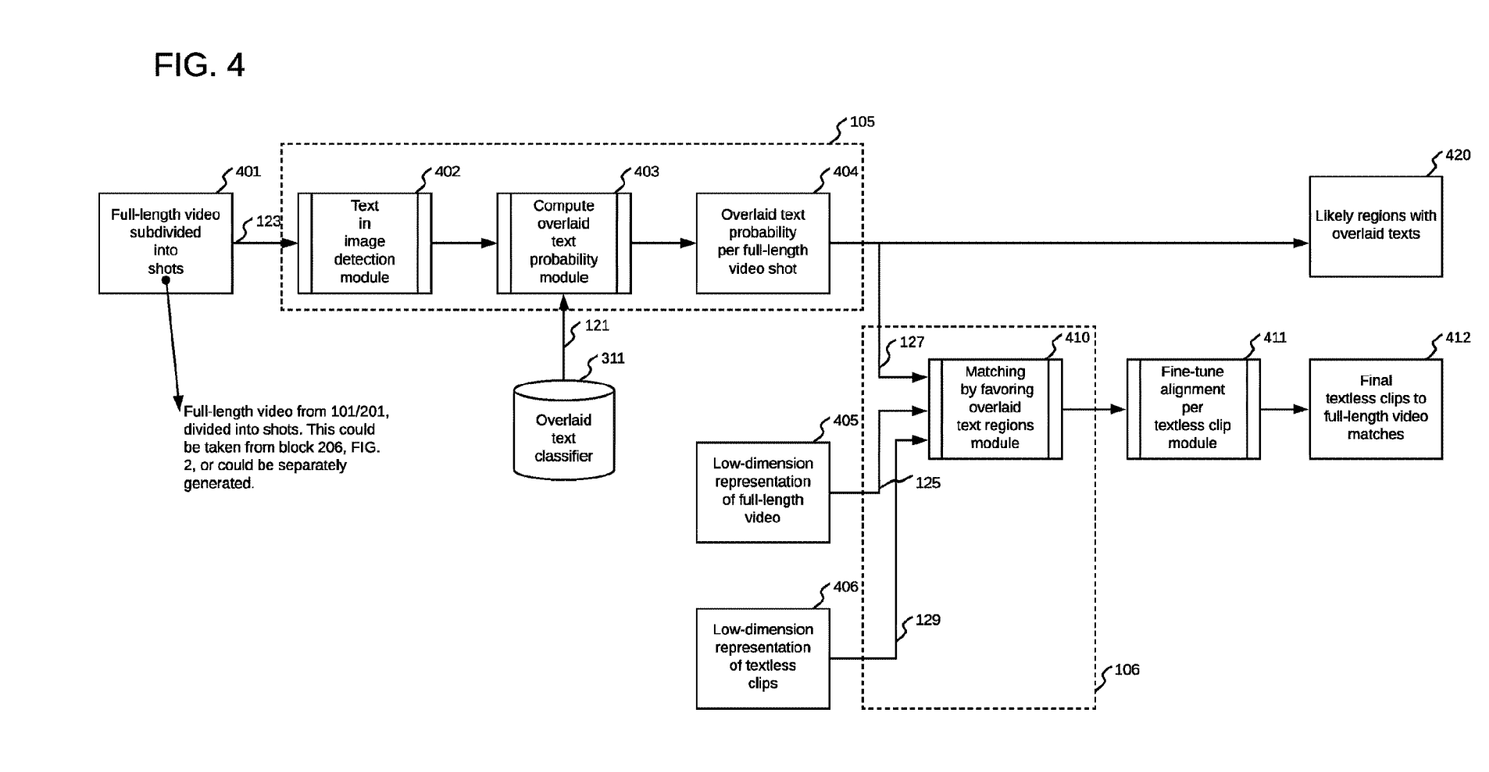
FIG. 4 illustrates an example implementation of a process for matching two videos by favoring portions with overlaid text.

With reference to FIG. 4, there is illustrated in more detail an example of the matching texted portions of the full-length video with textless clips in modules 105 and 106 of FIG. 1, which is the third and fourth phases of the process.

The third phase of the described method is for the two videos to be re-matched based on the classifier being able to differentiate where the overlaid texts appear within the full-length video.

This phase begins with each of the shots of the full-length video in step 401, extracted during step 206 of phase one (see FIG. 2) being provided. Hence the signal on line 123 is preferably the input to this stage.

In module 402, text-in-image detection within the video frames is performed. This is the same text detection analysis technique as in step 303 of the previous phase, but now across all the shots of the entire full-length video, instead of just the unambiguously matched portions used to train the classifier.

A compute overlaid text probability module 403 receives the output of module 402, and the overlaid text classifier stored in step 311.

The overlaid text classifier 311 is the machine learning-trained classifier. This is applied in module 403 to classify the portions of the full-length video from module 402 which have text, or more specifically to classify the text boxes across the full-length video that was detected by module 402.

Thus each of the detected text boxes (portions of the video having text boxes) are sent as inputs to the overlaid text classifier trained in the last phase 311, which generates in module 403 as an output the probability of an input text box being overlaid text or not, in module 404.

The probability is calculated using the classifier model chosen, such as Naïve Bayes or neural networks. These are existing techniques and thus out of scope of this application.

In doing so, the entire full-length video can be scored based on portions where there is a high probability of overlaid texts. As described earlier, these probabilities are necessary for the ambiguous matching case where multiple shots are visually similar. In factoring where the overlaid text is most likely to appear within the possible matches, the likelihood of choosing the correct match to the textless counterpart is greatly improved.

This matching is carried out in the next module 410, which is the fourth phase of the process.

The matching module 410 of FIG. 4 corresponds to the matching module 106 of FIG. 1. The matching module 410 receives the output from module 404. In addition the matching module 410 receives a low-dimension representation of the full-length video on line 125, and a low-dimension representation of textless clips on line 129. These are provided respectively through modules 111 and 113 of FIG. 1. The provision of such low-dimension versions is preferable, and will be determined by implementation requirements.

This fourth phase thus takes as inputs the two low-dimensional representations of the input videos generated in steps 405 and 406.

The probabilities for overlaid text within the full-length video from module 404 are used in conjunction with the distance metric for finding the best match between each textless clip and its full-length counterpart.

Module 410 performs matching similar to module 212, but whereas module 212 only did unambiguous matching, ambiguous matching is now being processed too in module 410.

Where inputs 405 and 406 generate an ambiguous result (which would be discarded in FIG. 2), the output of 404 is now used to choose between them based on their probabilities. So now all clips can be matched, not just the unambiguous ones.

Thus the first pass looks for unambiguous matches, and the second pass gets help from the classifier to disambiguate the remaining matches.

There are multiple possible methods for implementing the matching process of module 410. The simplest method is to apply the probabilities as a bias, or weighting, of the distance metrics, such that distances are reduced for higher probability portions of overlaid text. This approach effectively ignores the visual differences caused by the addition of overlaid texts to the full-length video. The rest of the matching process would be exactly the same as the unambiguous matching step 212 of phase one.

Another possibility is to block out the image areas within both videos where the overlaid texts are detected, such that the distance metrics are computed with the overlaid texts removed. This method has the advantage of being more reliable, provided the text detection model is sensitive enough to identify most of the overlaid texts. The drawback of this approach is the added computational cost for blocking out the image areas and re-computing the distance metrics, which can be quite expensive if this step is done per comparison between a textless clip against the full-length video. One possible optimization is to apply this block out step as an added verification once there's sufficient similarity using the default matching approach.

Note that the probabilities for overlaid texts are used as a bias factor, rather than absolute truth, in that they are not used to reject portions deemed to have no overlaid texts prior to matching. This is necessary due to limitations and noise of text detection step, where false negatives can occur. That is, overlaid texts can go undetected due to varying conditions, such as due to size, extreme skew, distortion, highly stylized, etc. If the described method simply ignored video portions where no texts were detected, this approach would guarantee to miss these matches. Therefore, these probabilities are instead used to boost the matching likelihood for video portions known to have overlaid text, but not to penalize the opposite case. This allows for misses of the text detection to be matched based on visual similarity alone.

After this fourth phase of the described process optionally each of the textless clips may be refined to full-length video matches by aligning the two video portions on a per-frame basis in module 411. Recall that up to this point, for efficiency reasons all of the matching is preferably based on shots, which are groupings of visually comparable frames. As such, shots would group frames with subtle movements, such as a single person speaking where only the facial region moves, into a single shot. While using shots may be sufficient for the matching process between textless clip to the full-video portion where this person is speaking, these shot-based matching would not be sufficient to be frame-accurate, which is required so as to not introduce audio-video synchronization issues and other visual glitches between transitions, or other visual glitches such as lip synchronisation issues.

Therefore, in this final step, the individual frames, instead of shots, of both the full-length video and the textless clips are used for the final alignment. That is, for each of the matches, which provides the starting and ending shots of both videos, the video frames of just these portions are decoded from the videos. These frames are compared frame by frame via the same distance metrics as before, in order to find the alignment that results in the minimal distance between the textless and full-length video frames. In doing so, the alignment is frame-accurate since the overall distance is calculated across all of the frames of the two video portions, instead of grouped shots.

The end result is the precise start and end frames where each textless clip should be spliced into the full-length video in 412, which is the information required to generate the textless version of the full-length video where the overlaid texts are removed, thus completing the process.

Because of the trained classifier (311) having computed the likelihood of every shot containing overlaid texts 404, any portions with high probability yet having no textless counterparts may also be saved as extra output for editorial review in module 420. That is, in error cases where textless clips are missing, the described method is able to identify portions of possible overlaid text within the full-length video. They can then be reviewed as possible video portions where the overlaid texts should have textless clips re-supplied by the content producer, thus providing an automatic way to flag problem areas within the textless replacement process. Additionally, these portions can be used for identifying on-screen texts that may need to be translated for international audiences, especially for texts that affect the story-telling of the video.

The training process may be separate to the full process. So, for example, the training may be done on matched unambiguous pairs (as per FIG. 2 and FIG. 3), and then once training is complete the trained classifier is used for processing the full video stream as per FIG. 4.

FIG. 1 may be split into a training part (103/104) and an operational part (105/106/107). They may be two distinct processes—once the training part is complete, the operational part is used. However, the training part does still rely on analyzing the entire full-length video to find the unambiguous matches, since it is not known ahead of time where they appear within the full-length video.

In a training part, which may apply to, e.g., the first 10% of the video, the full architecture of FIG. 1 may be utilized.

In an operational part, which may apply to, e.g., the following 90% of the video, the elements 105, 106 may be utilized only. This provides an automated technique.

The techniques as described may be implemented on a computing device. The technique is preferably implemented at a server end of a client server connection. The functionality as described may be implemented in hardware, software, or a combination of hardware and software. When implemented in software (in full or in part) the functionality may be embodied in computer program code which, when executed on computer hardware, performs the functionality. The computer program code may be stored as part of a computer program, for example on a computing device, on disk, on a memory disk. The computer program may be stored on a non-transient device.

The invention has been described by way of reference to examples and embodiments. The invention is not limited to the specifics of any example given. Different features of different aspects may be combined. No feature is limited as being only utilised in combination with the other features with which it is described.

The invention claimed is:

1. A method of processing a video file with overlaid text and a textless video file without overlaid text comprising a plurality of textless video clips, wherein the textless video clips are derived from the video file, the method comprising:
   comparing each textless video clip to a plurality of portions of the video file, the plurality of portions corresponding to a full length of the video file;
   determining each textless video clip that has a video portion image similar to only one video portion image of the video file as an unambiguous match;
   determining each textless video clip which has a video portion image similar to more than one video portion image of the video file as an ambiguous match;
   creating a matched pair for each textless video clip and portion of the video file which is an unambiguous match;
   creating a potential matched pair for each textless video clip and each portion of the video file which is an ambiguous match;
   comparing, for each matched pair, a text content of the textless video clip and the portion of the video file;
   identifying, for each matched pair, if the compared text content is different;
   determining, if the text content is different, that the textless video clip corresponds to a portion of the video file having overlaid text;
   training a classifier to predict whether an area of text detected in the full length video is overlaid text in dependence on this identification and determination;
   determining a probability of each portion of the full length video having overlaid text via the trained classifier; and
   resolving the potential matched pairs with the determined probability as being matched pairs.

2. The method of claim 1, further comprising a step of decompressing the video file and decompressing the plurality of textless video clips prior to the comparing step.

3. The method of claim 1 further comprising a step of decoding the video file and the plurality of textless videos into individual frames prior to the comparing step, and extracting individual textless clips by identifying start and end points of individual clips, such that the textless video is a collection of short video frames and the full length video is one long collection of video frames.

4. The method of claim 1 further comprising grouping the video file into shots and grouping the video clips into shots, each shot comprising a series of frames that are considered to contain the same amount of visual information, and converting each shot into a low-dimension representation, wherein converting each shot into a low-dimension representation comprises selecting one frame of the shot to represent all frames of the shot.

5. The method of claim 4 further comprising discarding information not needed for a matching process to provide a more compact representation, taking the low-dimensional representation per shot from each textless clip, and searching for matches within the low-dimensional representation per shot from the full length video, wherein the searching comprises allocating a distance metric to each comparison, with a lowest metric indicating the most likely match, the method further comprising applying a threshold to assess the distance information, wherein there is determined: (i) a set of matched textless clips, corresponding to textless clips which are determined to match only one portion of the video file, and (ii) a set of unmatched textless clips which are determined not to match only one portion of the video file.

6. The method of claim 1, wherein the step of determining the textless video clips having an image being similar to only one portion of the video file is unambiguous matching.

7. The method of claim 1, wherein the pair of matched textless video clip and similar only one portion are represented in their original frames for the identifying step.

8. The method of claim 1 further comprising performing text-in-image detection of an image frame per shot of both videos.

9. The method of claim 1 wherein there is provided a set of text boxes, and an identification of video frames in which they appear.

10. The method of claim 9 further comprising comparing each text box per shot from the full length video with ones from the textless clips, wherein any difference indicates that overlaid text is present in the full length video, and the absence of a difference indicates that the text is background text.

11. The method of claim 7, further comprising training a classifier based on this comparison, which receives as inputs pairs comprising overlaid text and background text, the classifier defining a model.

12. The method of claim 4 further computing a probability for each shot of the full length video, that each shot includes overlaid text, in dependence on a classifier model.

13. The method of claim 12 further comprising allocating a probability of overlaid text to each portion of the video having text.

14. The method of claim 13 further comprising identifying those portions of the video file having text and applying a probability to those identified portions.

15. The method of claim 12 further comprising determining each textless video clip having an image being similar to more than one image of more than one portion of the video file, and selecting one portion of the video file for that textless video clip independence on the one having the highest probability of overlaid text.

16. The method of claim 12 further comprising taking the low-dimensional representation per shot from each textless clip, and searching for matches within the low-dimensional representation per shot from the full length video.

17. The method of claim 13 further comprising increasing the likelihood of matching proportional to a probability of each shot including overlaid text.

18. The method of claim 16 further comprising taking a frame from each textless clip, and searching for per-frame matches within each frame from its unambiguously matched portion of the full length video, to find a frame offset that results in the overall minimum distance.

19. The method of claim 1 wherein the portions of the video which are unambiguously matched to a textless clip are output as final matches, and the method further comprising aligning the output final matches.

20. A device for processing a video file with overland text and a textless video file without overlaid text comprising a plurality of textless video clips, wherein the textless video clips are derived from the video file, the device comprising:
  a matching module for comparing each textless video clip to a plurality of portions of the video file, the plurality of portions corresponding to a full length video file, the matching module configured to:
    determine each textless video clip having a video portion image being similar to only a video portion image of only one portion of the video file as being an unambiguous match;
    determine each textless video clip having a video portion image being similar to only a video portion image of only one portion of the video file as being an unambiguous match,
    create a matched pair for each textless video clip and portion of the video file which is an unambiguous match; and
    create a potential matched pair for each textless video clip and each portion of the video file which is an ambiguous match,
  a training module configured to:
    compare, for each matched pair, a text content of the textless video clip and the portion of the video file;
    identify, for each matched pair, if the compared text content is different;
    determine, if the text content is different, that the textless video clip corresponds to a portion of the video file having overlaid text; and
    training a classifier to predict whether an area of text detected in the full length video is overlaid text in dependence on this identification and determination;
  a processing module configured to:
    determine a probability of each portion of the full length video having overlaid text via the trained classifier;
    resolve the potential matched pairs with the determined probability as being matched pairs.

* * * * *